(12) United States Patent
Rooyakkers et al.

(10) Patent No.: US 6,213,577 B1
(45) Date of Patent: Apr. 10, 2001

(54) EQUIPMENT STORAGE APPARATUS

(75) Inventors: Albert Rooyakkers, Norton; John M. Porter, Attleboro, both of MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/240,513

(22) Filed: Jan. 29, 1999

Related U.S. Application Data
(60) Provisional application No. 60/093,863, filed on Jul. 23, 1998.

(51) Int. Cl.$^7$ .................................................. A47B 47/03
(52) U.S. Cl. ...................................... 312/265.3; 312/265.1; 211/26
(58) Field of Search .............................. 312/257.1, 265.1, 312/265.2, 265.3, 265.4, 265.5, 265.6, 223.1, 223.2, 223.6, 351.1, 324, 326, 328, 209; 211/26, 189; 174/50; D13/184; D14/100, 240; 52/653.1

(56) References Cited

U.S. PATENT DOCUMENTS

| | | | |
|---|---|---|---|
| D. 108,756 | 3/1938 | Swanson . | |
| D. 326,008 | 5/1992 | Hudson et al. | D13/184 |
| D. 366,247 | 1/1996 | Mazura et al. | D13/184 |
| D. 390,835 | 2/1998 | Mayfield, III | D13/184 |
| 3,563,627 * | 2/1971 | Whipps | 312/265.2 |
| 4,017,134 | 4/1977 | Lenglin et al. | 312/351 |
| 4,102,554 * | 7/1978 | Reimer | 312/265.1 X |
| 4,126,364 * | 11/1978 | Reilly | 312/265.1 X |
| 4,988,008 * | 1/1991 | Blum et al. | 211/189 |
| 5,176,437 * | 1/1993 | Remington | 312/351.1 |
| 5,228,762 * | 7/1993 | Mascrier | 312/265.1 X |
| 5,292,189 * | 3/1994 | Lau et al. | 312/265.3 |
| 5,294,748 | 3/1994 | Schwenk et al. . | |
| 5,372,262 * | 12/1994 | Benson et al. | 211/26 |
| 5,536,079 | 7/1996 | Kostic | 312/265.3 |
| 5,571,256 * | 11/1996 | Good et al. | 312/223.1 X |
| 5,574,251 | 11/1996 | Sevier | 174/50 |
| 5,645,174 | 7/1997 | Rieger et al. | 211/26 |
| 5,749,476 * | 5/1998 | Besserer et al. | 211/26 |
| 5,807,008 * | 9/1998 | Schwenk et al. | 312/265.1 X |
| 5,934,485 * | 8/1999 | Harris et al. | 211/26 |
| 5,992,646 * | 11/1999 | Benner et al. | 312/265.3 X |
| 6,005,188 * | 12/1999 | Teichler et al. | 174/50 |

FOREIGN PATENT DOCUMENTS

WO 97/13304 * 4/1997 (WO) .

* cited by examiner

Primary Examiner—James O. Hansen
(74) Attorney, Agent, or Firm—David J. Powsner; David Barron; Jules J. Morris

(57) ABSTRACT

Equipment storage apparatus, such as equipment racks and cabinets, according to the invention have a vertical load bearing member with a stepped cross-section. Thus, for example, a load bearing member of a frame according to one aspect of the invention can have two faces on its front: one with a frontward directed normal for accommodating equipment mounts, and one with a frontward directed normal for accommodating front door mounts. A pair of such load bearing members can be provided, along with one or more horizontal cross-pieces or other such structural elements, to form a frame defining a generally rectangular central region in which mounted equipment is disposed.

16 Claims, 8 Drawing Sheets

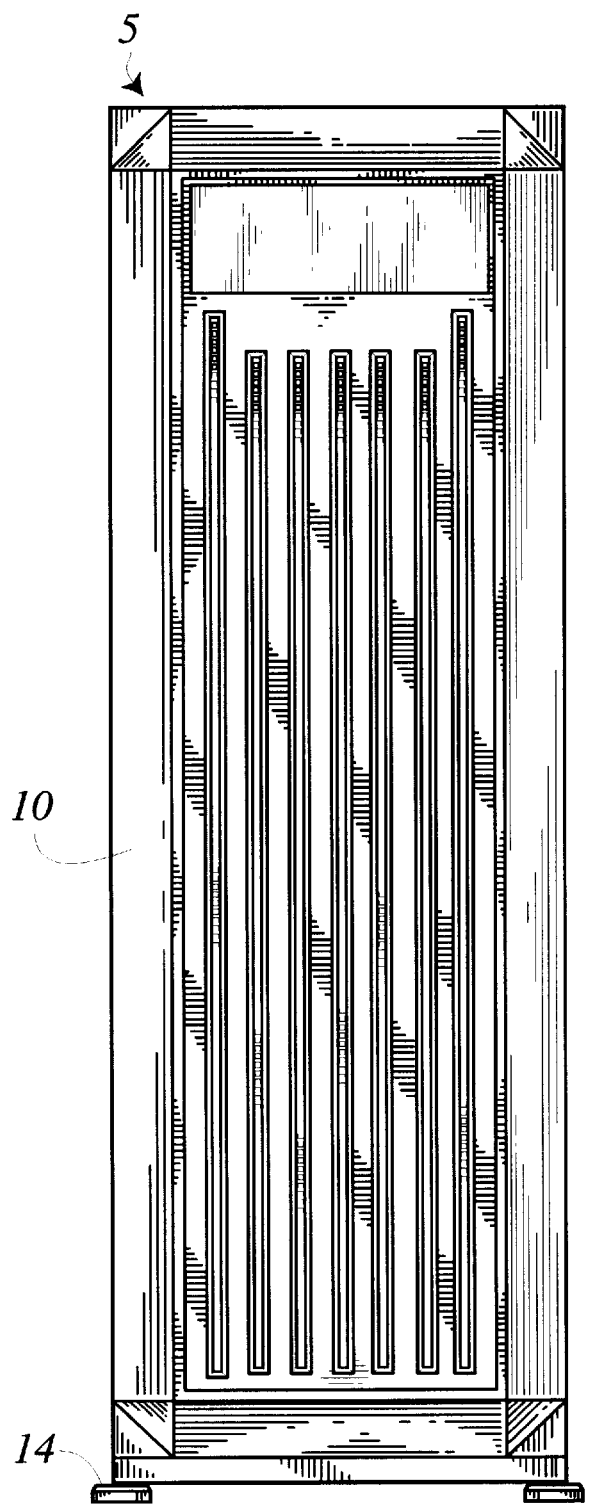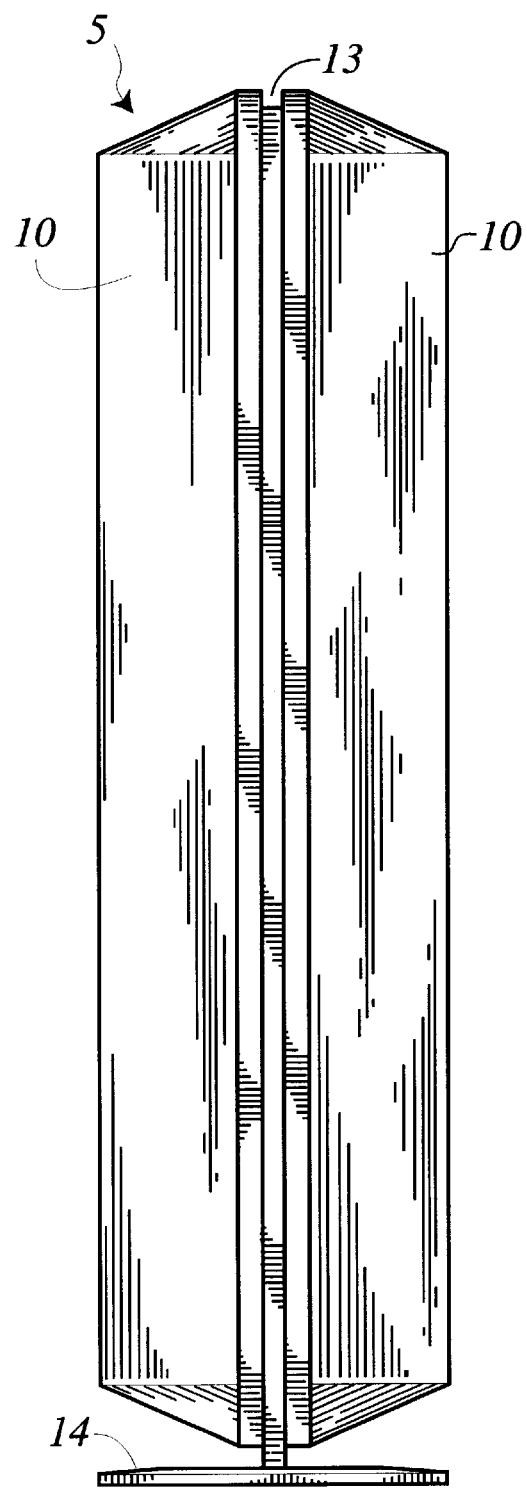
FIG. 5  FIG. 6

EQUIPMENT STORAGE APPARATUS

REFERENCE TO RELATED APPLICATIONS

This application claims the benefit of U.S. Provisional Application Ser. No. 60/093,863, filed Jul. 23, 1998, for RACK-MOUNT EQUIPMENT ENCLOSURE (Attorney Docket 0274331-017), the teaching of which is incorporated herein by reference.

BACKGROUND OF THE INVENTION

The present invention relates to equipment storage apparatus, such as equipment racks and cabinets for holding electronic, laboratory and industrial equipment. The invention has application both in storing equipment for use in plants, laboratories, and other sites, as well as in shipping such equipment.

Equipment storage apparatus hold electronic, laboratory and industrial equipment, including, computers, controllers, test equipment, communications devices, and so forth. In addition to providing storage, they isolate the equipment and protect it from bumps, jolts, dust, temperature fluctuations and other environmental factors. Some storage apparatus also protect equipment users from radiation or other hazards presented by the equipment.

The prior art offers a variety of designs for equipment storage apparatus. One common design is an "open rack" (here, simply referred to as a "rack"), which typically comprises a doorless, substantially rectangular frame. Equipment is mounted to vertical members of the frame, either directly or via shelf-like attachments. An advantage of open racks is that they are relatively lightweight and, therefore, can be easily shipped or handled. A drawback of open equipment racks is that they provide the equipment only minimal protection from external hazards, and vice versa.

Another common design for equipment storage apparatus is the enclosed rack or cabinet. These typically comprise box-like shells comprised of panels, with internal mounting brackets for attachment of the equipment. Examples of this design are provided in U.S. Pat. Nos. 4,017,134; 5,294,748; 5,536,079; 5,574,251. By enclosing the equipment, the cabinets afford it isolation from the environment. A drawback, however, is that equipment cabinets are exceedingly heavy and, therefore, difficult to transport. In addition, they must often be assembled from many parts, a task that can take hours.

An object of the present invention is to provide improved equipment storage apparatus.

A further object is to provide such storage apparatus as are lightweight, yet, strong and that can be readily transported.

A still further object is to provide such apparatus as can be easily assembled.

Yet a still further object of the invention is to provide such apparatus as can be used, not only, to store equipment, but also to protect it during shipment.

Yet still another object of the invention is to provide such apparatus as can be readily converted between open (i.e., rack) and closed (i.e., cabinet) configurations.

Still yet another aspect of the invention is to provide such apparatus as can be manufactured at low cost, using known techniques and readily available materials.

SUMMARY OF THE INVENTION

The invention achieves the foregoing objects by providing equipment storage apparatus, including novel equipment racks and cabinets based thereon, for use in storing and shipping equipment.

An equipment rack according to one aspect of the invention has a vertical load bearing member with a stepped cross-section. As used herein, a member is said to have a "stepped cross-section" if two or more of its external faces have surface normals disposed in substantially the same direction, yet, those faces lie in different planes.

Thus, for example, a load bearing member of a frame according to one aspect of the invention can have two faces on its front: one with a frontward directed normal for accommodating equipment mounts, and one with a frontward directed normal for accommodating front door mounts. An "edge" or other member (e.g., with a non-frontward directed normal) can affix the two faces to one another in different—but substantially parallel—planes.

According to a related aspect of the invention, a pair of such load bearing members can be provided, along with one or more horizontal cross-pieces or other such structural elements. These form a frame defining a generally rectangular central region in which mounted equipment is disposed.

Further aspects of the invention provide an equipment rack as described above in which both the front and back of a load bearing member have stepped cross sections. Thus, in addition to two faces on its front as described above, such a member can have one rear face with a rearward directed normal for accommodating additional equipment mounts, and another with a rearward directed normal for accommodating rear door mounts. As above, these two rear faces can be affixed, e.g., by an edge, so that they lie in different planes.

According to a still further aspect of the invention, an additional "edge" affixes the front and back door mount-accommodating faces to one another. This forms a cavity in the interior recesses of the frame that can receive the post of a foot, floor stand or other member, e.g., upon which the frame can rest.

A load bearing member with a stepped front and back can, according to further aspects of the invention, be symmetrical about a plane defined by the aforementioned central region (i.e., the region in which the mounted equipment is disposed). The resulting frame accommodates the mounting of equipment from either side—or, in the case of cabinets according to the invention, the mounting of identical or similarly constructed doors, hinges, handles and other structures, on either side.

Further aspects of the invention provide equipment racks as described above in which the vertical or load bearing members have more than three faces arranged in stepped configuration. Thus, for example, in addition to the two front faces and two back faces as described above, the member can include an additional frontward directed face disposed intermediate to, and in different planes from, the frontward directed equipment mount- and door mount-accommodating faces. In addition to enhancing the structural integrity of the load bearing member, the intermediate frontward-directed face provides a surface against which a gasket or other edge portion of a door or other panel may rest in the. This is useful when the frame is configured as part of an equipment cabinet.

To this end, a still further aspect of the invention provides an equipment cabinet that includes an equipment rack of any of the types described above. These cabinets, which form partial or full enclosures for the equipment, additionally include front and/or rear doors, panels or other covers that can be pivotably, removably, or otherwise affixed to the door mount-accommodating portions of the load bearing members.

These and other aspects of the invention are evident in the drawings and in the detailed description that follows.

BRIEF DESCRIPTION OF THE DRAWINGS

A more complete understanding of the invention may be attained by reference to the drawings, in which:

FIGS. 5 and 6 are front and side views, respectively, of the cabinet of FIG. 1 with its front door or panel closed;

DETAILED DESCRIPTION OF THE ILLUSTRATED EMBODIMENT

Figure 1:
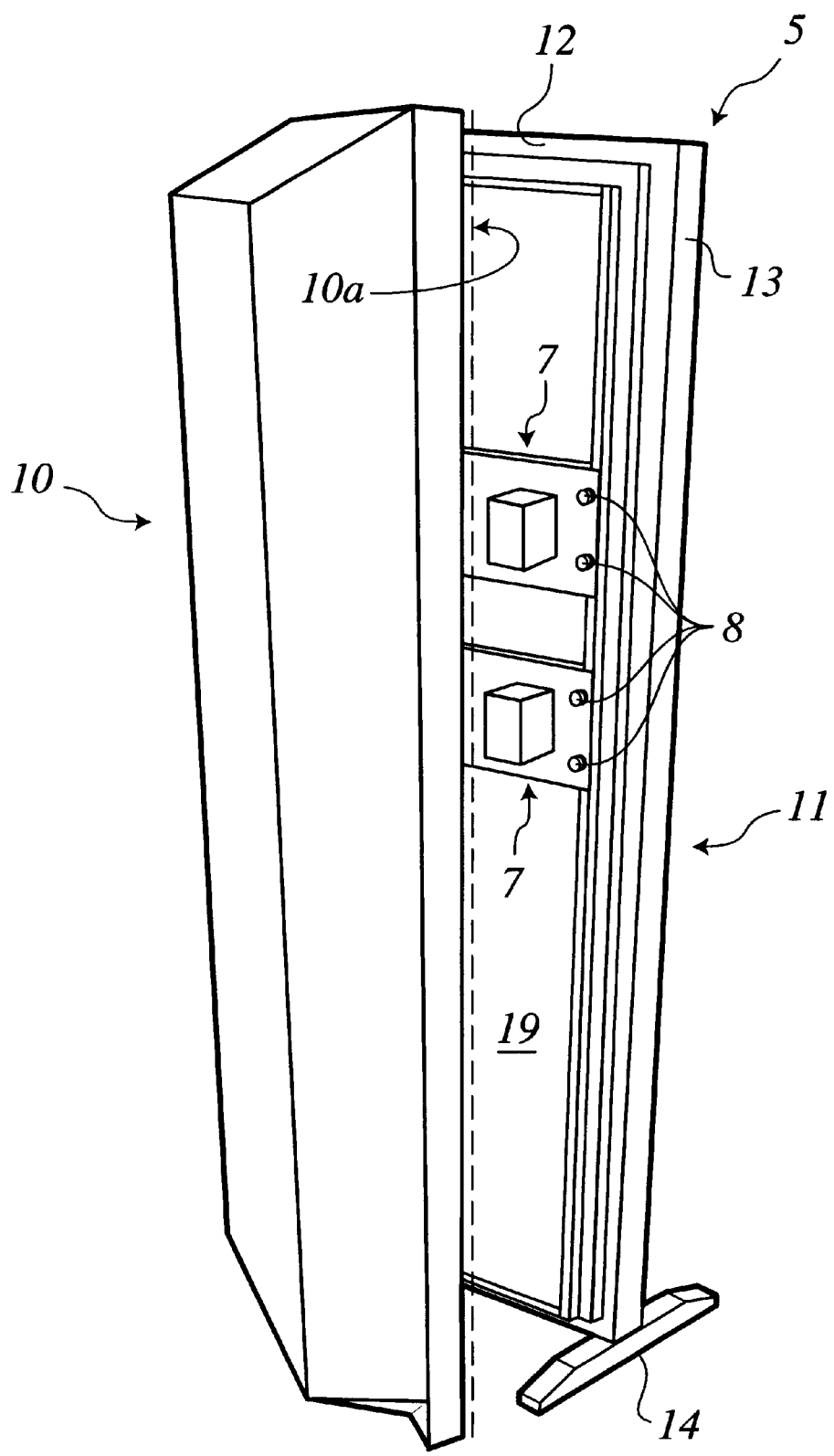
FIG. 1 depicts an equipment storage apparatus, to wit, an equipment cabinet, according to the invention with a front door that is partially open.

FIG. 1 illustrates an equipment storage apparatus 5, to wit, a cabinet, according to the invention. It includes a front door 10, a rear door (not shown), and a frame 11. The latter includes substantially vertical load-bearing members 13 and substantially horizontal structural members 12, though those skilled in the art will appreciate that these members may be oriented in other directions.

In the illustrated embodiment, members 12 and 13 are configured to define a generally rectangular central region 10 for accommodating electronic equipment, laboratory equipment, industrial equipment or other items 7 (collectively, "equipment"), though the members may define regions of other shapes as well. Door 10, which is pivotally mounted on a hinge (see FIGS. 10a–10b) on one of the vertical members is shown swung partially open. Floor stand 14 or other such stabilizing element is affixed at the base of the frame to hold the cabinet 5 in an upright position.

As used herein, a "load bearing" member, often referred to as a "vertical" member for convenience, is a structural element to which equipment is mounted. In typical usage, such a member is vertically oriented and bears the load of such equipment, though neither is necessarily true for all embodiments or applications of the invention. Indeed, the so-called "load bearing" members can be oriented horizontally (in which case they may lose much of their load bearing functions, yet, retain the equipment mount- and door mount-accomodating functions described herein) and the structural members can be oriented vertically (in which case they gain much of the load bearing functions).

Figure 2:
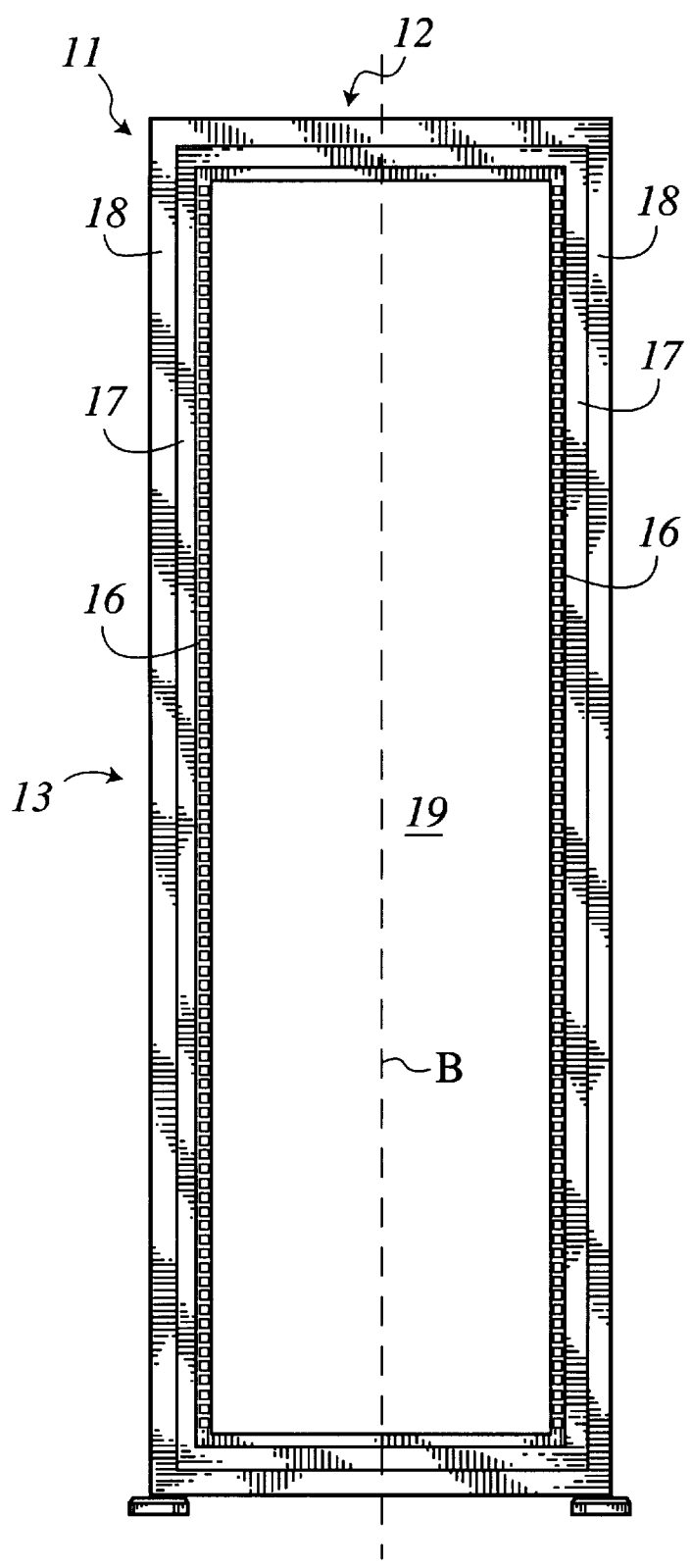
FIGS. 2 and 3 are front and side views, respectively, of the frame of the cabinet of FIG. 1, as well as of an rack-style equipment storage apparatus according to the invention.
Figure 3:
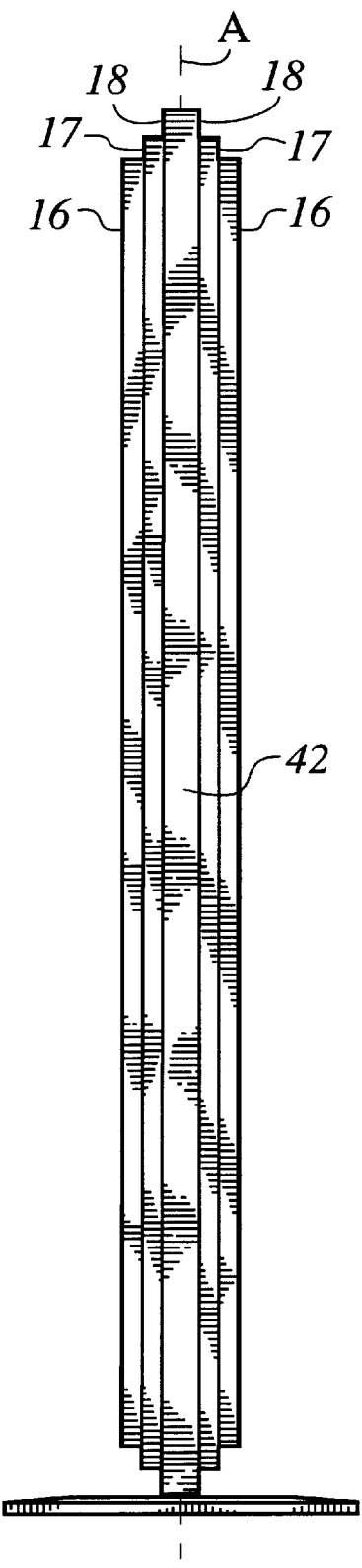

In one embodiment of the invention, frame 11 is used with front and/or back doors 10 as part of an equipment cabinet of the type shown in FIG. 1 and as further illustrated in front and side views in FIGS. 5 and 6. In an alternative embodiment, the frame is used without doors as an equipment rack. FIGS. 2 and 3 are front and side views, respectively, of the frame. Though only two views are shown, illustrated frame 11 is substantially symmetric about its front-to-back and side-to-side midlines A and B (or, alternatively stated, by the planes whose cross-sections are represented by dashed lines in FIG. 2 and 3).

Figure 4:
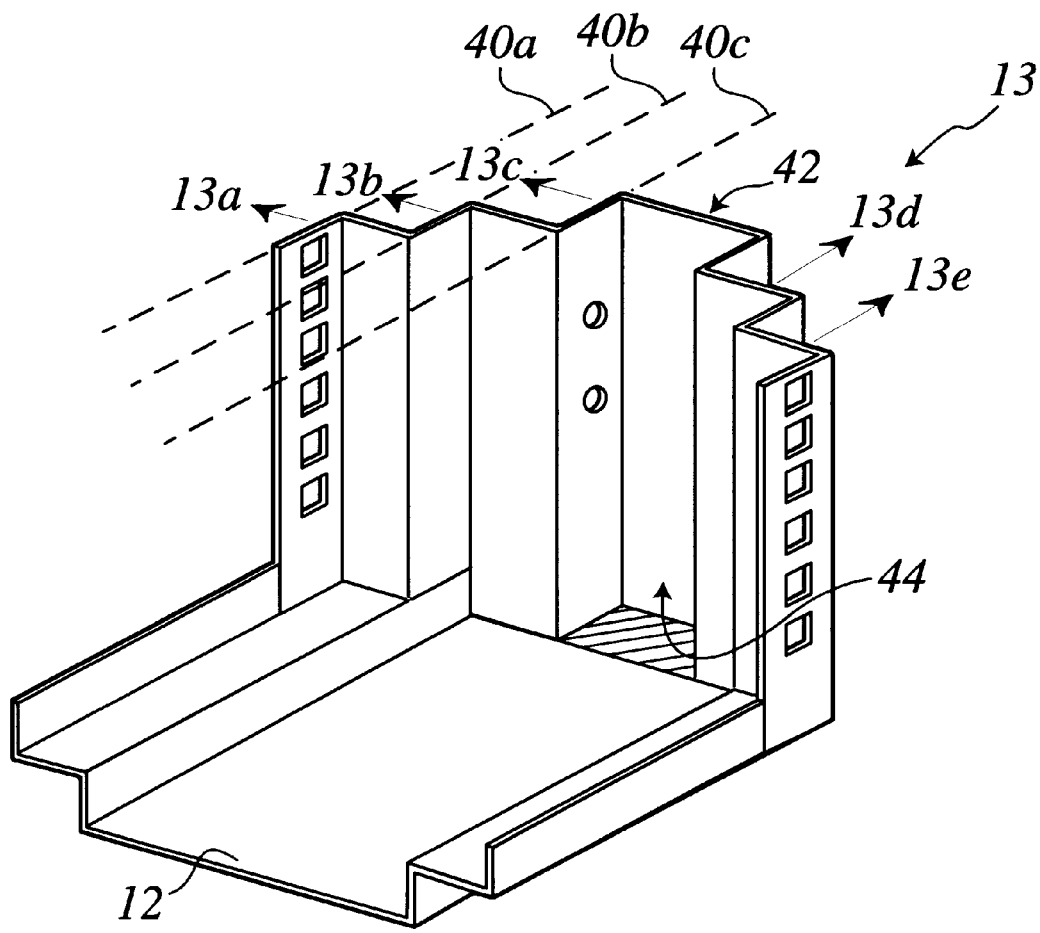
FIG. 4 shows a cross section of a frame of FIGS. 2 and 3.

As shown in FIGS. 2–3 and as still more clearly shown in FIG. 4, the vertical or load bearing members 13 have stepped cross sections, both in front and back. Thus it has three faces on its front whose normals are directed substantially frontward (see arrows 13a–13c), yet, which lie in different planes, as indicated by dashed lines 40a, 40b, 40c. These three faces are structurally connected with one another via edges (or other faces) whose normals are directed other than frontward. The member 13 likewise has three faces on its back whose normals are directed rearward (i.e., or in the opposite direction from the normals of the faces on the front) and which are connected by edges (or other faces) whose normals are directed elsewise (see arrows 13d–13e).

Referring to FIG. 2, the face or portion 16 (whose normal is denoted by arrow 13a in FIG. 4) accommodates mounts 8 (see FIG. 1) for the equipment 7. In the illustrated embodiment, these mounts attach to the member 13 via round apertures regularly spaced along that face. Though the illustrated apertures are round, those skilled in the art will appreciate that any other shape, alignment or spacing may be employed. Indeed, no apertures need be provided at all, e.g., if the equipment can be otherwise mounted to face 16. In accord with industry standards, the distance between the regions 16 of members 13 on opposing sides of frame 11 is substantially equal to 19", though other widths (by non-limiting example, 23") may be used as well.

With reference to FIGS. 1–2, the face or portion 17 (whose normal is denoted by arrow 13b in FIG. 4) serves as a contact for a gasket, edge or other portion 10a of door or panel 10. Of course, the door 10 or portions thereof may also contact other portions of the frame 11. Face 17 is disposed further from (or distal to) central region 19 vis-a-vis face 16, which itself lies adjacent to region 19 in the illustrated embodiment.

Face or portion 18 (whose normal is denoted by arrow 13c in FIG. 4) accomodates mounts for door 10, panel, or other structure for partially or fully covering equipment mounted in the frame 11. As above, those skilled in the art will appreciate that the apertures may be of any shape (e.g., round or square), alignment or spacing. Indeed, no apertures need be provided at all, e.g., if the doors can be otherwise mounted to face 18.

Figure 10A:
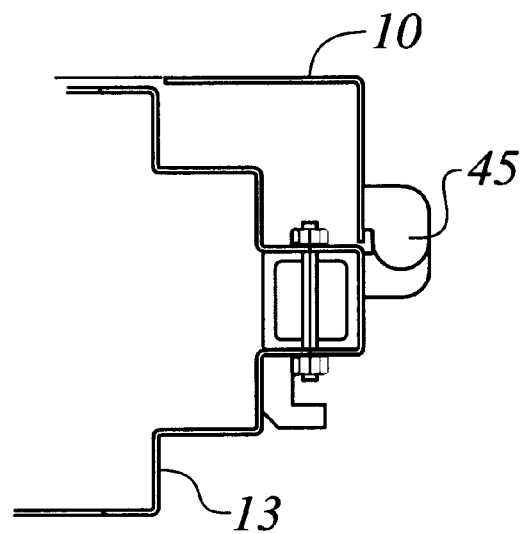
FIGS. 10a–10b depict a hinged mounting for holding a panel or door to the frame of an equipment cabinet according to the invention.
Figure 10B:
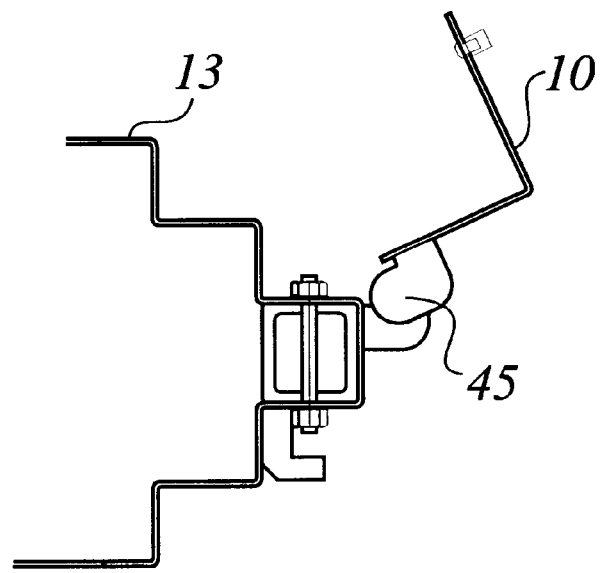

Preferably, the mounts are hinges that permit the doors to be pivotably opened. A prefered arrangement for such mounting is illustrated in FIGS. 10a and 10b, which respectively show the door 10 closed and swung partially open on the hinge 45. In alternative embodiments, the mounts may be sliding mechanisms (e.g., rails), fastening mechanisms (e.g., bolts and/or nuts), magnetics, mating hook-and-loop structures, or other known mechanisms suitable for holding a door or panel to member 13.

As evident in FIGS. 3–4 and noted above, both the front and back of illustrated frame 11 have stepped cross sections joining at edge 42 (FIG. 3). A consequence of the resulting "stepped V" construction is that the distance separating the equipment mount-accommodating faces 16 are separated by a distance that is greater than the distance separating the gasket-contacting faces 17 which distance, in turn, is greater than that separating the door mount-accommodating faces 18.

Frame 11 may be constructed of metal, plastic, ceramics, wood or any other material (or combination thereof) of suitable for maintaining the desired configuration. In a preferred embodiment, the load bearing members 13 are formed from cold rolled steel and welded to horizontal members 12. The latter (i.e., horizontal members 12) may be of any configuration suitable to affixation to the load bearing members and, where applicable, for contacting the bottom and/or top edges of door 10. A preferred cross-section for horizontal members 12 is illustrated in FIG. 4.

Door 10 may likewise be constructed of metal, plastic, ceramics, wood or any other suitable material. In a preferred embodiment, it is fabricated from plastics, such as ABS or ABS blends. Where otherwise necessary or convenient, each door may be fabricated in multiple parts that are ultrasonically welded, glued or otherwise fixed together. Alteratively, the doors may be attached to frame 11 in several parts, each of which may be opened or removed separately from the other parts. The doors 10, or their several parts, may be vented as appropriate. Additionally, their edges may be provided with gasketing material to improve or otherwise affect contact with the frames and, particularly, for example, with faces 17.

In a preferred embodiment, front and back doors are stackable. This allows one door to be removed and nestled within the other door for shipping or storage. Although both doors can be stacked and shipped separately from the frame 11, an advantage of the illustrated system is that they can be used to protect the frame and any equipment stored therein during shipment. Thus, for example, a manufacturer may load a frame 11 with equipment 7 requested by a customer. The back door 10 may be mounted on the frame 11 and, then, nestled in the front door (which is not mounted to the frame) for shipment. The assembly may then be placed in a box, a crate, or the like, for shipping.

Figure 11:
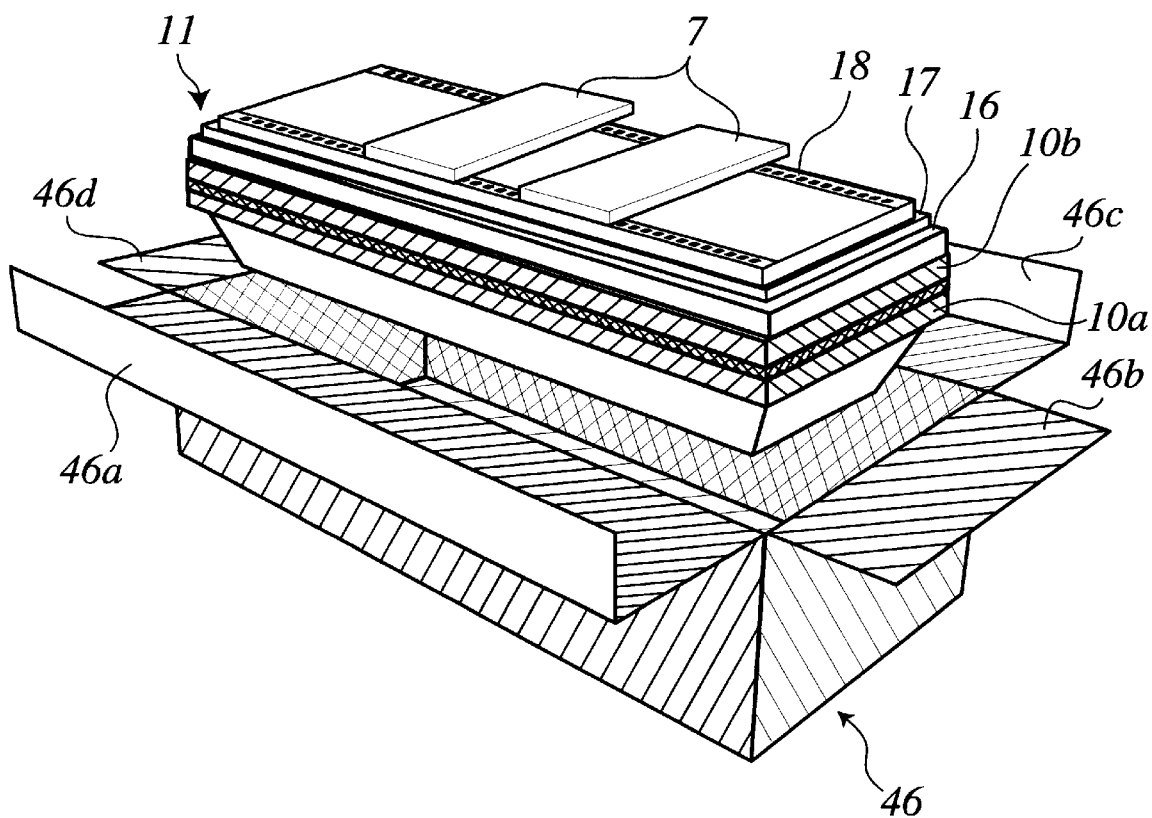
FIG. 11 depicts an arrangement of doors for shipping an equipment cabinet according to the invention.

This is illustrated in FIG. 11, showing back door 10b mounted on frame 11 (and its attendant faces 16, 17, 18), which itself is populated with equipment 7. The door 10b is nestled in front door 10a, and the entire assembly is disposed above shipping carton 46, with its open flaps 46a, 46b, 46c, 46d. Since the nestled doors provide protection for the back of the equipment 7 and frame 11, further packaging material need only be placed over the front (i.e., where the front door 10 will ultimately be mounted).

Figure 7:
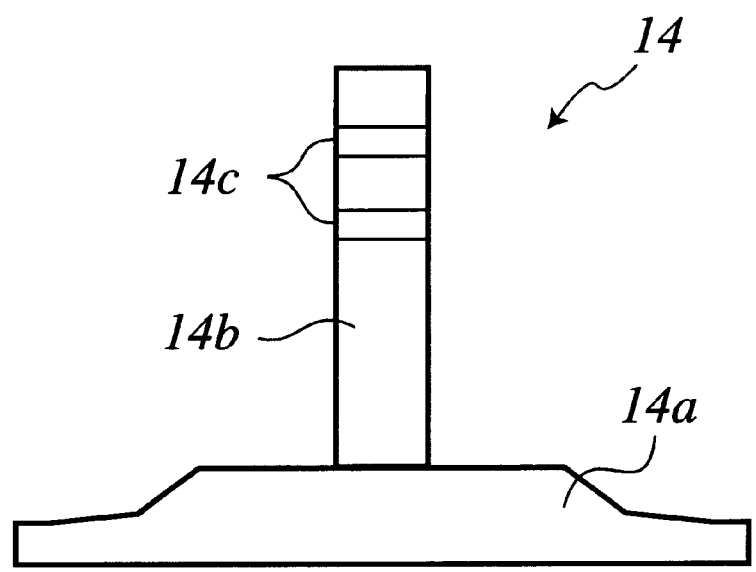
FIGS. 7 and 8 show a floor stand for use with an equipment storage apparatus according to the invention.
Figure 8:
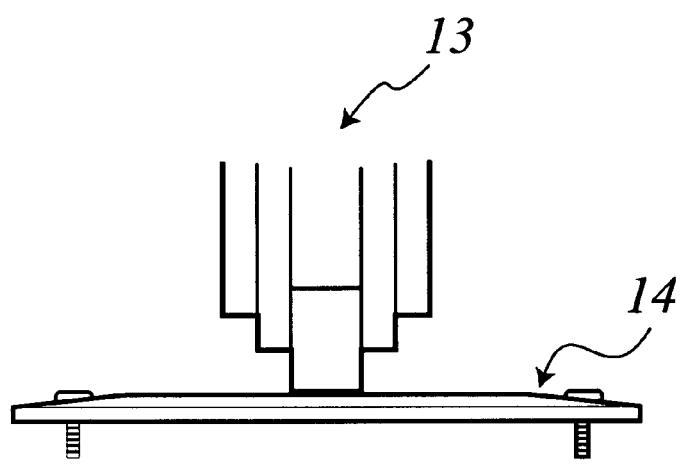
Figure 9:
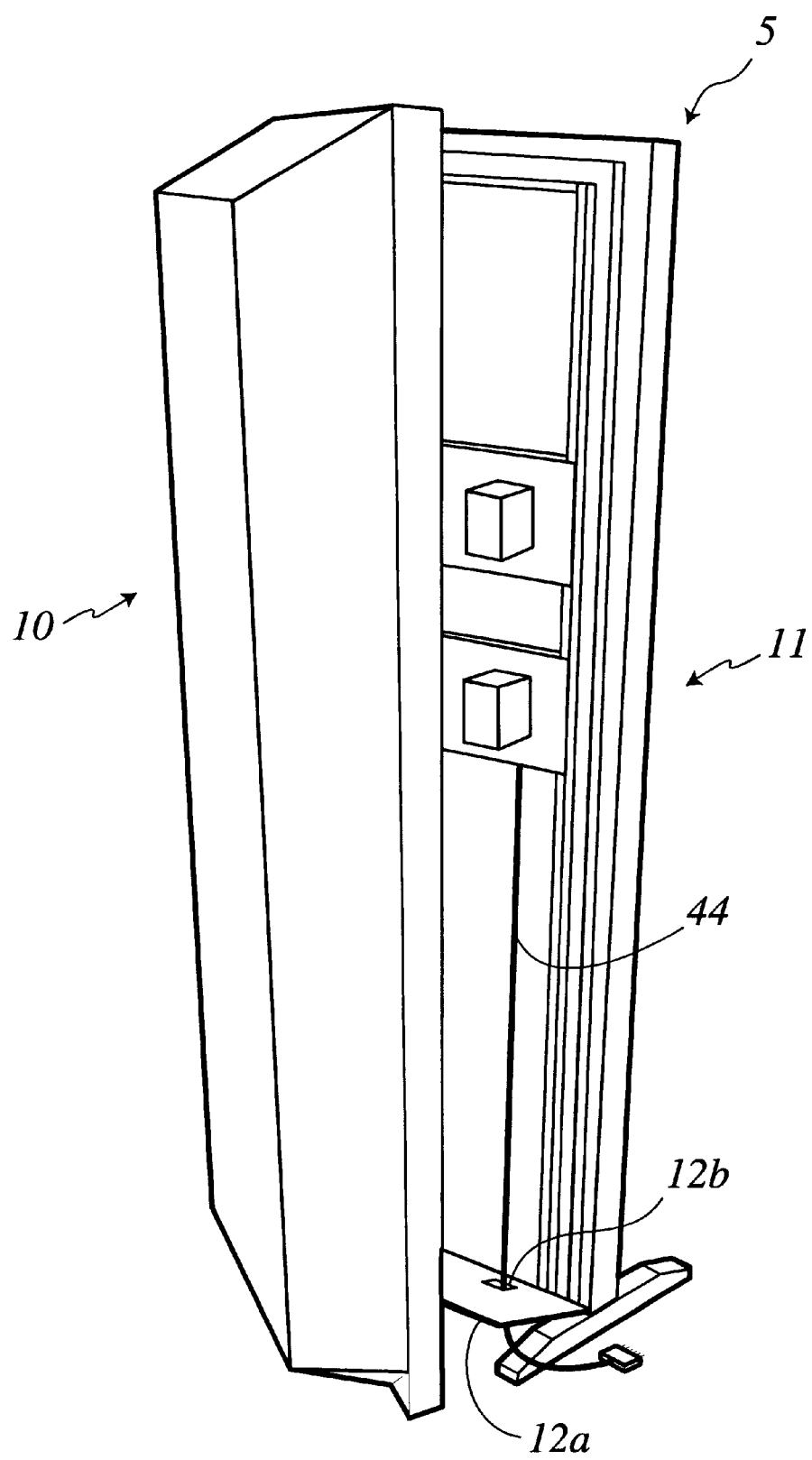
FIG. 9 depicts an equipment cabinet according to the invention with a cable routing panel attached to the lowermost cross-piece of the frame.

FIG. 7 is a side view of the floor stand 14 upon which frame 11 rests. The floor stand 14 preferably includes a foot 14a for stabilizing the frame and distributing its weight, as well as a post 14b for engagement with the frame. In a preferred embodiment, the post 14b may be slidably engaged into a vertical member 13, particularly, at the bottom of frame 11, in the recess 44 defined behind door mount-accommodating faces 18 and face 42. To this end, the post 14b can include apertures 14c to accommodate pins, bolts or other members that allow the post 14b to be secured within the recess 44. FIG. 8 illustrates the floor stand 14 so secured within vertical member 13.

The stand 14 can be removed from the frame 11 to reduce its overall dimensions and/or weight, e.g., for purposes of shipping or storage. Preferably, recesses are provided in the top and/or bottom doors 10 to hold the stand 14 during shipment.

Those skilled in the art will appreciate that the invention is not limited to use with a floor stand of the type shown in FIG. 7–8, and that other such stands or techniques may be used to stabilize the frame 11, instead. Thus, for example, a frame may be secured by posts mounted directly in the floor. Indeed, the frame may be secured horizontally or in other orientations where so desired or necessary.

Embodiments of the invention contemplate several techniques for accommodating cabling for the equipment 7. For example, cutouts may be provided in the bottoms of the doors, or in the lowermost cross-piece 12 of the frame, for routing cables to and from the equipment. Where applicable such cutouts may be provided in the face of a door, in a topmost cross-piece 12 of the frame, or directly in a vertical member 13.

In still another embodiment, a panel 12a is affixed to lowermost cross-piece 12 with apertures 12b for routing of cables, such as illustrated cable 44. Door 10 is shaped to accommodate the panel accordingly.

Storage appartaus according to the invention have numerous advantages. For example, unlike prior art racks, those according to the invention accommodate doors, in addition to hinges, door handles, a floor stand, and other related hardware. And, unlike prior art cabinets, those according to the invention can be fabricated rapidly, e.g., insofar as they do not require the time-consuming step of installing mounting brackets within a box-like shell. Moreover, cabinets according to the invention are strong, yet lighter in weight than prior art cabinets. Still further, the cabinets can be partially disassembled—even with equipment mounted therein—to provide a lightweight, strong container to facilitate shipping.

Described above are equipment storage apparatus meeting the desired goals. Those skilled in the art will appreciate that the embodiments shown in the drawings and discussed above are merely examples of the invention, and that other apparatus incorporating changes therein may fall within the scope of the invention. Thus, by way of non-limiting example, the load bearing members of may have stepped cross-sections other than those shown herein. In view of these and other such changes within the ken of those of ordinary skill in the art, what we claim is:

What is claimed is:

1. In equipment storage apparatus of type in which any of electronic, laboratory, industrial and other equipment is mounted, the improvement wherein at least one member to which such equipment is mounted has a front and a back, each having a stepped cross section, and each having two or more of external faces having surfaces lying in substantially different planes, the external faces of the front having normals directed in substantially a first direction, the external faces of the back having normals directed in substantially a second direction, wherein the first direction is substantially opposite from the second direction, and wherein the member has one or more planar surfaces that affix at least one external face on the front to at least one external face on the back.

2. In equipment storage apparatus according to claim 1, the further improvement wherein the member has two or more of external faces having surfaces lying in substantially different planes, which surfaces have normals directed in substantially the same direction.

3. In equipment storage apparatus according to claim 2, the further improvement wherein at least one of the front and the back of the member has a planar surface disposed between two external faces thereof that affixes those external faces to one another in different, but substantially parallel, planes.

4. In equipment storage apparatus according to claim 3, the further improvement wherein the planar surface has a surface normal directed in a substantially different direction than that of the external faces that it affixes.

5. In equipment storage apparatus according to claim 1, the further improvement wherein an external face on the front of the member accommodates any of a door, panel or other cover for at least partially covering the cabinet, an external face on the back of the member accommodates any of a door, panel or other cover for at least partially covering the cabinet, and one or more surfaces disposed between two external faces that affixes to one another those external faces on the front and back of the member that accommodate any of a door, panel or other cover.

6. In equipment storage apparatus according to claim 5, the further improvement wherein a recess is formed in an interior of the member by the
   (i) external face on the front of the member that accommodates any of a door, panel or other cover,
   (ii) external face on the back of the member that accommodates any of a door, panel or other cover, and
   (iii) the one or more surfaces disposed between the two external faces that affixes those external faces to one another.

7. In an equipment storage apparatus according to claim 6, the further improvement wherein the recess is arranged to slidably receive a post of any of a foot, floor stand and other member upon which the apparatus is stabilized.

8. An equipment storage apparatus comprising
   A. at least two vertical members for accommodating equipment mounts, the vertical members forming at least part of a perimeter of a region in which mounted equipment is disposed,
   B. at least one of the vertical members having three or more external faces having surfaces lying in substantially different planes, which surfaces have normals directed in substantially the same direction,
   C. a first one of the external faces accommodating mounts for the equipment,
   D. a second one of the external faces accommodating mounts for a door, and
   E. a third one of the external faces contacting an edge portion of a door.

9. An equipment storage apparatus according to claim 8, comprising any of a door, panel and other cover affixed to one of the external faces that accommodates mounts for a door.

10. An equipment storage apparatus according to claim 9, wherein any of the door, panel and other cover is hingedly affixed to the external face that accommodates mounts for a door.

11. An equipment storage apparatus comprising
    A. at least two vertical members forming a portion of a perimeter of a region in which mounted equipment is disposed,
    B. a front of each of the vertical members having a first external face that accommodates equipment mounts and having a second external face that accommodates door mounts, the first external face on the front of each of the vertical members being disposed adjacent to the region in which mounted equipment is disposed, the second external face on the front of each of the vertical members being disposed distal to the first external face of that member relative to the region in which mounted equipment is disposed,
    C. a back of each of the vertical members has a first external face that accommodates equipment mounts second external face that accommodates door mounts, the first external face on the back of each of the vertical members being disposed adjacent to the region in which mounted equipment is disposed, the second external face on the back of each of the vertical members being disposed distal to the first external face of that member relative to the region in which mounted equipment is disposed, and
    D. the first external face and the second external face of the front and back of each of the vertical members having surfaces lying in substantially different planes, wherein the surfaces of the front of each of the vertical members are directed in substantially a frontward direction, and wherein the surfaces of the back of each of the vertical members are directed in substantially a rearward direction.

12. An equipment storage apparatus according to claim 11, wherein a distance between the first external faces on the front and back of each vertical members is greater than a distance between the second external faces on the front and back of the each vertical members.

13. An equipment storage apparatus, comprising
    A. a substantially rectangular frame defining a region in which mounted equipment is disposed,
    B. the frame having two vertical members, a front of each of the vertical members having
       i. a first external face that accommodates equipment mounts,
       ii. a second external face that contacts any of a gasket or an edge portion of a door,
       iii. a third external face that accommodates door mounts,
       the first external face on the front of each of the vertical members being disposed adjacent to the region in which mounted equipment is disposed, the second external face on the front of each of the vertical members being disposed distal to the first external face of that member relative to the region in which mounted equipment is disposed, the third external face on the front of each of the vertical members being disposed distal to the second external face of that member relative to the region in which mounted equipment is disposed, and
    C. the first, second and third external face of the front of each of the vertical members having surfaces lying in substantially different planes, which surfaces have normals directed in substantially a frontward direction.

14. An equipment storage apparatus according to claim 13, wherein a back of each of the vertical members has
    i. a first external face that accomodates equipment mounts,
    ii. a second external face that contacts any of a gasket and an edge portion of a door,
    iii. a third external face that accomodates door mounts,
    the first external face on the front of each of the vertical members being disposed adjacent to the region in which mounted equipment is disposed, the second external face on the front of each of the vertical members being disposed distal to the first external face of that member relative to the region in which mounted equipment is disposed, the third external face on the front of each of the vertical members being disposed distal to the second external face of that member relative to the region in which mounted equipment is disposed, and the first, second and third external face of the back of each of the vertical members having surfaces lying in substantially different planes, which surfaces have normals directed in substantially a rearward direction.

15. An equipment storage rack according to claim 14 comprising any of a door, panel or other cover mounted to the third external face on any of the front and back of any of the vertical members.

16. An equipment storage rack according to claim 14 comprising any of a first door, panel or other cover mounted to the third external face on any of the front and back of any of the vertical members, and comprising a second door, panel or other cover mounted to the third external face on any of the front and back of any of the other vertical members.

* * * * *